United States Patent
Checka et al.

(10) Patent No.: US 11,694,318 B2
(45) Date of Patent: Jul. 4, 2023

(54) ELECTRONIC SUBSTRATE DEFECT DETECTION

(71) Applicant: Minds AI Technologies Ltd, Hong Kong (HK)

(72) Inventors: Neal Checka, Concord, MA (US); Christos Mario Christoudias, Point Pleasant Beach, NJ (US)

(73) Assignee: Minds AI Technologies Ltd, Hong Kong (HK)

( * ) Notice: Subject to any disclaimer, the term of this patent is extended or adjusted under 35 U.S.C. 154(b) by 0 days.

(21) Appl. No.: 17/555,173

(22) Filed: Dec. 17, 2021

(65) Prior Publication Data

US 2022/0309637 A1 Sep. 29, 2022

Related U.S. Application Data

(63) Continuation of application No. 17/214,491, filed on Mar. 26, 2021, now Pat. No. 11,216,932.

(51) Int. Cl.
*G06K 9/00* (2022.01)
*G06T 7/00* (2017.01)
(Continued)

(52) U.S. Cl.
CPC .......... *G06T 7/0002* (2013.01); *G06N 3/045* (2023.01); *G06N 3/08* (2013.01); *G06T 7/337* (2017.01);
(Continued)

(58) Field of Classification Search
CPC ................. G06T 7/0002; G06T 7/337; G06T 2207/20024; G06T 2207/20081;
(Continued)

(56) References Cited

U.S. PATENT DOCUMENTS

| 6,122,397 A * | 9/2000 | Lee .................. G06T 7/001 382/141 |
| 2012/0027285 A1* | 2/2012 | Shlain ............... G06F 18/2178 382/149 |

(Continued)

FOREIGN PATENT DOCUMENTS

| JP | 2004/108902 A | 4/2004 |
| JP | 2018/096908 A | 6/2018 |

OTHER PUBLICATIONS

Makhzani et al., "Adversarial Autoencoders," arXiv:1511.05644v2 [cs.LG] May 25, 2016.

(Continued)

*Primary Examiner* — Samir A Ahmed
(74) *Attorney, Agent, or Firm* — Innovators Legal

(57) ABSTRACT

This disclosure provides systems, methods, and apparatus detecting defects in a substrate. An image of the substrate is compared with a reference image to identify potential defects. Images corresponding to the potential defects are processed sequentially by a set of classifiers to generate a set of images that include a defect. The set of classifiers can be arranged to have increasing accuracy. A subset of the images corresponding to the potential defects is processed by a type classifier that can determine the type, size, and location of the defect in the images. The defects can be further processed to determine the severity of the defects based on the location of the defects on the substrate.

16 Claims, 12 Drawing Sheets

(51) Int. Cl.
G06T 7/33 (2017.01)
G06N 3/08 (2023.01)
G06N 3/045 (2023.01)

(52) U.S. Cl.
CPC ............ G06T 2207/20024 (2013.01); G06T 2207/20081 (2013.01); G06T 2207/20084 (2013.01); G06T 2207/20224 (2013.01)

(58) Field of Classification Search
CPC . G06T 2207/20084; G06T 2207/20224; G06T 2207/20021; G06T 2207/30141; G06T 7/001; G06N 3/045; G06N 3/08; G06N 3/048
See application file for complete search history.

(56) References Cited

U.S. PATENT DOCUMENTS

| | | | | |
|---|---|---|---|---|
| 2016/0358041 | A1* | 12/2016 | Venkataraman | G06V 10/772 |
| 2017/0082555 | A1* | 3/2017 | He | G06N 20/20 |
| 2019/0047134 | A1* | 2/2019 | Snook | B25B 23/0035 |
| 2019/0155164 | A1 | 5/2019 | Chen et al. | |
| 2019/0303522 | A1 | 10/2019 | Green et al. | |

OTHER PUBLICATIONS

Huang et al., "A PCB Dataset for Defects Detection and Classification," Journal of Latex Class Files 14(8): 1-9, Aug. 2018.

McClure, "Building an End-to-End Defect Classifier Application for Printed Circuit Boards," Towards Data Science, Feb. 2020 (Accessed Dec. 17, 2020). https://towardsdatascience.com/building-an-end-to-end-deep-learning-defect-classifier-application-for-printed-circuit-board-pcb-6361b3a76232.

Adibhatla et al., "Defect Detection in Printed Circuit Boards Using You-Only-Look-Once Convolutional Neural Networks," Electronics 9: 1547, 2020.

Cheong et al., "Defects and Components Recognition in Printed Circuit Boards Using Convolutional Neural Network," International Conference on Robotics, Vision, Signal Processing & Power Applications 2018, Penang, Malaysia.

Kaur et al., "Detection and Classification of Printed Circuit Boards Defects," Open Transactions of Information Processing 1(1): 8-16, 2014.

Long et al., "Fully Convolutional Networks for Semantic Segmentation," arXiv:1411.4038v2 [cs.CV] Mar. 8, 2015.

Sambasivarao, "Non-maximum Suppression (NMS)," Towards Data Science, Oct. 2019.

Qu et al., "PartsNet: A Unified Deep Network for Automotive Engine Precision Parts Defect Detection," Preprint, Oct. 2018.

Ding et al., "TDD-net: a tiny defect detection network for printed circuit boards," CAAI Transactions on Intelligence Technololgy 4(2): 110-116.

Deng Yu-Shan et al: "Building an Automatic Defect Verification System Using Deep Neural Network for PCB Defect Classification", 2018 4th International Conference on Frontiers of Signal Processing (ICFSP), IEEE, Sep. 24, 2018 (Sep. 24, 2018), pp. 145-149, XP033457713, DOI: 10.1109/ICFSP.2018.8552045 (retrieved on Nov. 28, 2018).

* cited by examiner

ELECTRONIC SUBSTRATE DEFECT DETECTION

CROSS-REFERENCE TO RELATED APPLICATIONS

This application is a continuation of co-pending U.S. patent application Ser. No. 17/214,491, filed Mar. 26, 2021, which is herein incorporated by reference in its entirety.

TECHNICAL FIELD

This disclosure relates to the field of electronic systems, in particular electronic systems for determining defects in electronic substrates.

DESCRIPTION OF THE RELATED TECHNOLOGY

Substrates such as printed circuit boards (PCBs) can have a multi-stage manufacturing process. The process can include stages such as, for example, etching, bonding, metal deposition, drilling, plating, solder-masking, etc. Each one of the manufacturing stages can potentially introduce defects into the PCB.

SUMMARY

In one aspect, a method includes receiving an input substrate image of an electronic substrate. The method further includes generating a difference image based on comparison of the input substrate image with a reference substrate image. The method also includes identifying based on the difference image at least one potential defect image region including a potential defect in the substrate. The method also includes generating at least one image patch corresponding to the at least one potential defect image region based on correlating the at least one potential defect image region with the reference substrate image. The method further includes generating a set of classified defect image patches from the at least one image patch based on processing the at least one image patch with a defect presence classifier that classifies each of the at least one image patch as containing or not containing a defect. The method also includes determining a type of defect associated with each classified defect image patch of the set of classified defect image patches based on processing the set of classified defect image patches with a defect type classifier that classifies each classified defect image patch with a defect type selected from a set of defect types. The method further includes determining a location on the electronic substrate and a size of a defect in each classified defect image patch of the set of classified defect image patches, and storing, in a database, the type of defect, the location, and the size of the defect associated with each classified defect image patch of the set of classified defect image patches.

In some embodiments, the method further includes aligning the input substrate image with the reference substrate image prior to generating the difference image. In some embodiments, the method further includes filtering the difference image based on at least one of intensity threshold filtering and morphological filtering to identify the at least one potential defect image region. In some embodiments, the method also includes determining contiguous regions of potential defects based on a connected components algorithm. In some embodiments, the set of classified defect image patches is progressively reduced in size based on processing with one or more additional defect presence classifiers. In some embodiments, the method further includes tessellating the at least one image patch prior to generating the set of classified defect image patches based on the defect presence classifier. In some embodiments, the type of defect includes at least one of annular rings, solder joints and component misalignment.

In some embodiments, the method further includes cross-referencing the location and size of the defect in each classified defect image patch of the set of classified defect image patches with a data object describing critical structures of the electronic substrate, and determining a severity of defect in each classified defect image patch based on at least one of a degree of overlap between the defect in the classified defect image patch and the critical structures of the electronic substrate or a type of defect associated with the classified defect image patch.

In some embodiments, the size of the defect in each classified defect image patch is determined based on at least one of a bounding box surrounding a defect, a rotated bounding box surrounding the defect, or a pixel-wise perimeter surrounding the defect. In some embodiments, the defect presence classifier is trained on images generated based on a combination of an autoencoder and a generative adversarial network (GAN). In some embodiments, the method further includes masking a plurality of regions in the input substrate image, the plurality of regions including at least one of a trace, a solder mask, and print regions, determining a mean local intensity variation between various regions of the input substrate image, and storing, in the database, an indication of color variation based on the mean local intensity variation exceeding a threshold value.

In another aspect, a non-volatile computer readable storage medium includes instructions stored therein, which when executed by a processor causes the processor to perform the method of receiving an input substrate image of an electronic substrate. The method further includes generating a difference image based on comparison of the input substrate image with a reference substrate image. The method also includes identifying based on the difference image at least one potential defect image region including a potential defect in the substrate. The method further includes generating at least one image patch corresponding to the at least one potential defect image region based on correlating the at least one potential defect image region with the reference substrate image. The method also includes generating a set of classified defect image patches from the at least one image patch based on processing the at least one image patch with a defect presence classifier that classifies each of the at least one image patch as containing or not containing a defect. The method further includes determining a type of defect associated with each classified defect image patch of the set of classified defect image patches based on processing the set of classified defect image patches with a defect type classifier that classifies each classified defect image patch with a defect type selected from a set of defect types. The method further includes determining a location on the electronic substrate and a size of a defect in each classified defect image patch of the set of classified defect image patches, and storing, in a database, the type of defect, the location, and the size of the defect associated with each classified defect image patch of the set of classified defect image patches.

In some embodiments, the method further includes aligning the input substrate image with the reference substrate image prior to generating the difference image. In some embodiments, the method further includes filtering the difference image based on at least one of intensity threshold filtering and morphological filtering to identify the at least one potential defect image region. In some embodiments, the method also includes determining contiguous regions of potential defects based on a connected components algorithm. In some embodiments, the set of classified defect image patches is progressively reduced in size based on processing with one or more additional defect presence classifiers. In some embodiments, the method further includes tessellating the at least one image patch prior to generating the set of classified defect image patches based on the defect presence classifier. In some embodiments, the type of defect includes at least one of annular rings, solder joints and component misalignment. In some embodiments, the method further includes cross-referencing the location and size of the defect in each classified defect image patch of the set of classified defect image patches with a data object describing critical structures of the electronic substrate, and determining a severity of defect in each classified defect image patch based on at least one of a degree of overlap between the defect in the classified defect image patch and the critical structures of the electronic substrate or a type of defect associated with the classified defect image patch. In some embodiments, the size of the defect in each classified defect image patch is determined based on at least one of a bounding box surrounding a defect, a rotated bounding box surrounding the defect, or a pixel-wise perimeter surrounding the defect.

BRIEF DESCRIPTION OF THE DRAWINGS

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

A large majority of electrical devices utilize electrical substrates, such as, for example, printed circuit boards (PCBs) to mount and interconnect various electrical components. These PCBs include locations to mount discrete electronic devices such as for example, integrated circuits, capacitors, resistors, etc., and one or more layers of meatal traces that interconnect the electronic devices. The multistage manufacturing process for PCBs can cause undesired defects to be introduced in the finished PCB.

Some approaches to detecting defects in PCBs include automated inspection approaches, which in turn include machine vision based computer software that compare PCB images with reference PCB images that are defect free. The software, based on the comparison of the images, then determines whether the PCB images includes any defects. Some software employ machine learning (ML) and/or artificial intelligence (AI) in to identify the defects in the PCB images. For example, in some instances, the ML and AI approaches utilize artificial neural networks to identify defects in the PCB image.

The automated inspection approaches discussed herein provide high accuracy in detecting defects in electronic substrates, such as, for example, PCBs. In some examples, the approaches include a cascade of detection stages with increasing detection complexity that can improve the accuracy with which an automated inspection software detects defects. Further, the number of detection stages employed can be statically or dynamically varied based on the required accuracy and the available computing resources, thereby reducing the amount of time required to complete the detection task for a given level or accuracy. As a result, the detection cab be completed with the shortest time for the desired accuracy.

Figure 1:
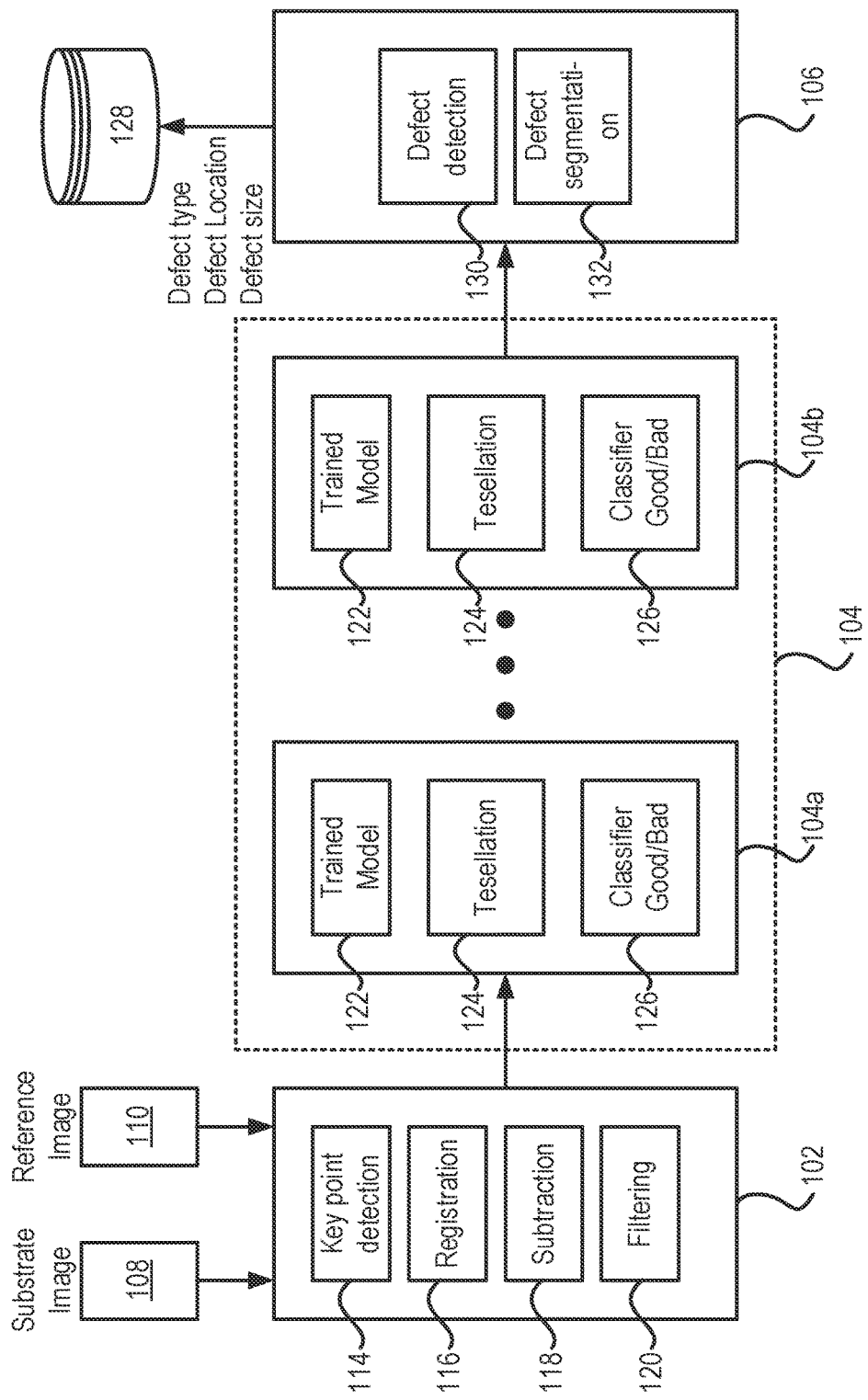
FIG. 1 shows a flow diagram of an example defect detection process.

FIG. 1 shows a flow diagram of an example defect detection process 100. In particular, FIG. 1 shows an example defect detection process for detecting defects in electronic substrates such as, for example, PCBs. The defect detection process 100 can detect manufacturing defects in electronic substrates and provide information about the detected defects. The information about the defects can include number of defects, identities or types of defects, the locations of the defects, the sizes of the defects, and the like. The defect detection process 100 also can provide context aware information regarding the detected defects. For example, the defect detection process 100 can indicate the severity of a defect based on where the defect occurs on the substrate. Some defects can be innocuous, for example, if they make no contact with other conductors or traces on the substrate, while some defects can be critical, for example, if they make contact with ball grid arrays. The defect detection process 100 can qualify the severity of detected defect based on the determining the location of the defect in relation to its location on the substrate. The defect detection process 100 also can detect changes in color variations over the surface of the substrate.

The defect detection process 100 can include an image processing stage 102, one or more defect presence classifier stages 104, and a defect characterization stage 106. The image processing stage 102 can receive an input substrate image 108 as well as a reference substrate image 110 and can compare the two images to determine differences. These differences can be further processed to identify potential defects. The defect presence classifier stages 104, each one of which can indicate whether an input image includes or does not include a defect. Where more than one defect presence classifier stages 104 are employed, the stages are progressively more complex which can correspond to progressively increasing accuracy. The defect presence classifier stages 104 can potentially narrow down the set of images provided by the image processing stage 102 into progressively smaller subset of images that have been identified as having defects. The defect presence classifier stage 104 provides the subset of images to the defect characterization stage 106, which determines, among other factors, the type of defect, the location of the defect, and the size of the defect in the subset of images.

Returning to the image processing stage 102, this stage can include a key point detection stage 114, a registration stage 116, a subtraction stage 118, and a filtering stage 120. The key point detection stage 114 aligns the input substrate image 108 with the reference substrate image 110. The conditions (e.g., light, orientation, magnification, background, camera equipment, etc.) under which the input substrate image 108 of the corresponding substrate may be captured may be different from the conditions under which the reference substrate image 110 may be captured. The comparison of such images could result in artifacts that are caused by the difference in conditions in which the images were taken and not by actual defects. In such cases, the artifacts may be misidentified as defects.

To reduce the risk of artifacts being misidentified as defects, the input substrate image 108 and the reference substrate image 110 can be scaled and aligned to ensure that the comparison between the images results in actual defects rather than conditions-based artifacts. To that end, the image processing stage 102 determines key points representing matched features in the images. The features can include, for example, corners, sharp edges, or other points that show sharp changes in intensity. In some examples, scale-invariant feature transform (SIFT) feature detector and descriptor algorithm can be utilized for identifying features and their descriptors (e.g., scale, location, and orientation). As an example, the orientation of the key point can be determined by computing a gradient magnitude and direction around the neighboring pixels of the key point to determine the orientation or direction of the key point. Other example algorithms such as "features from accelerated segment test (FAST)" and "speeded-up robust features (SURF)" can be used, which can be relatively faster than SIFT, to identify key points. While FAST only identifies the key points, SURF can identify key points as well as assign descriptors to the key points. In some examples, the "binary robust independent elementary feature (BRIEF)" algorithm can be used in conjunction with the FAST algorithm to assign descriptors to the key points identified by the FAST algorithm. Yet another algorithm that can be utilized is Oriented FAST and Rotated BRIEF (ORB) for determining the key points and assigning descriptors. Each of the above discussed algorithms can assign descriptors that are scale and rotation invariant. That is, the key point and its descriptor in an image may not vary even if the image is scaled or rotated.

Figure 2:
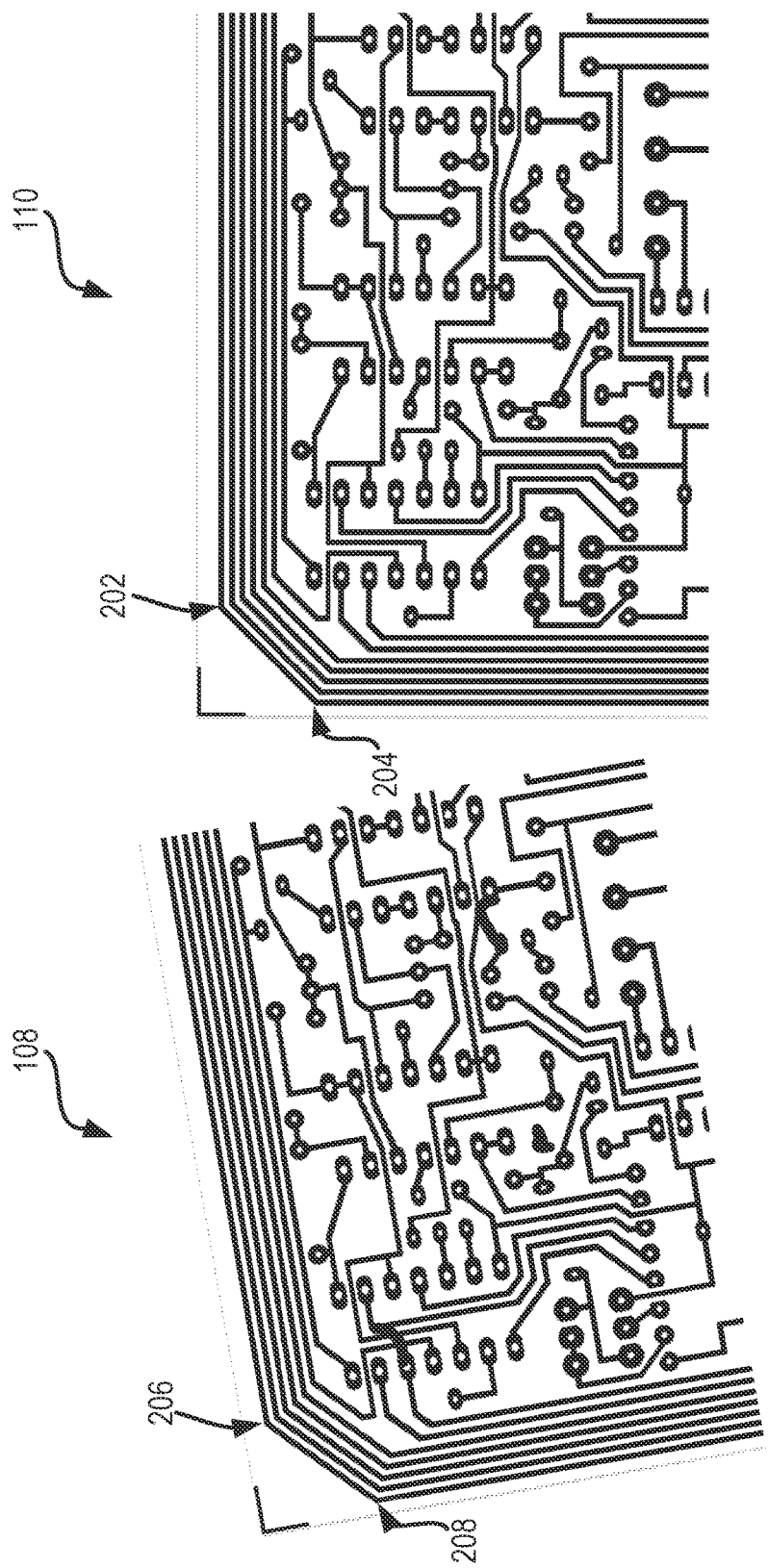
FIG. 2 shows key point detection in portions of an input substrate image and a reference substrate image.

The defect detection process 100 at the image processing stage 102 can determine the key points in the input substrate image 108 as well as the reference substrate image 110. FIG. 2 shows key point detection in portions of example input substrate image 108 and reference substrate image 110. The input substrate image 108 includes the input substrate, however, due to the conditions in which the image was captured, the input substrate appears rotated. The reference substrate image 110 on the other hand shows a portion of the reference substrate that is oriented in a manner that is different from the rotated orientation of the input substrate in the input substrate image 108. The image processing stage 102 can determine several key points in the reference substrate image 110. For simplicity only two key points: a first reference image key point 202 and a second reference image second reference image key point 204 are shown. The defect detection process 100 at the image processing stage 102 also can determine key points in the input substrate image 108. Again, for simplicity, only two key points: a first input image key point 206 and a second input image second input image second input image second input image key point 208 are shown. The defect detection process 100 at the image processing stage 102 based on the algorithms discussed above can determine the key points and assign descriptors to each key point. As mentioned above, one example descriptor can include the direction of the key point. This information can be used by the registration stage 116 to align the input substrate image 108 with the reference substrate image 110.

Figure 3:
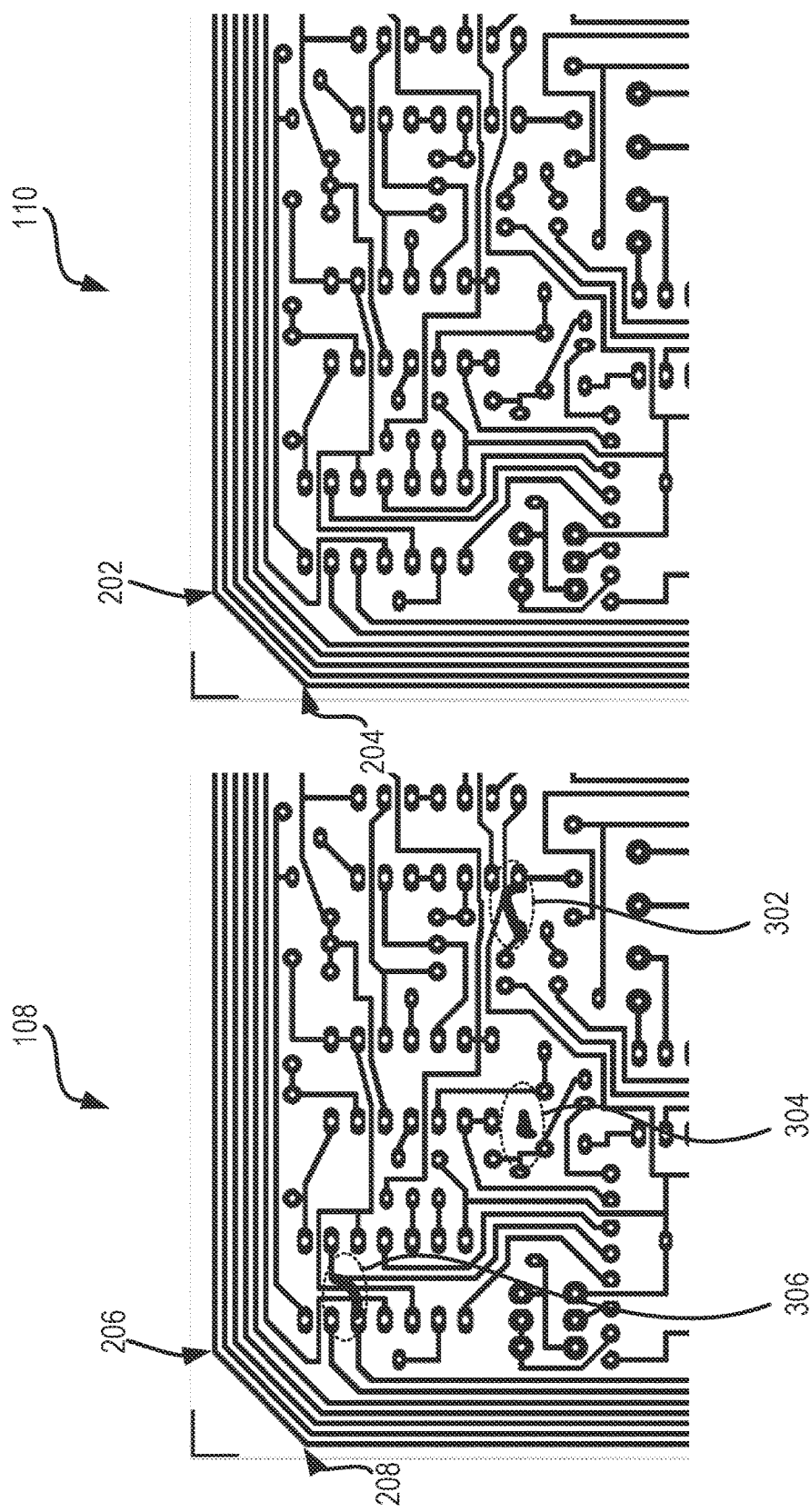
FIG. 3 shows an example result of image registration of the images shown in FIG. 2.

The defect detection process 100 at the registration stage 116 can determine key points in the input substrate image 108 that match the key points in the reference substrate image 110. For example, the defect detection process 100 can determine the key points in the input substrate image 108 that have the same descriptors. As noted above, the descriptors for the key points can be scale and rotation invariant. Thus, two key points in the two images that have matching descriptors most likely represent the same feature in the two images. Thus, referring to FIG. 2, the defect detection process 100 can determine that the first input image key point 206 has the same descriptors as the first reference image key point 202, and the second input image key point 208 has the same descriptors as the second reference image key point 204. The defect detection process 100 at the registration stage 116 can determine other matching key points in the input substrate image 108 and the reference substrate image 110. Once all the matching key points are determined, the defect detection process 100 can carry out transformations on the input substrate image 108. For example, the defect detection process 100 can rotate the input substrate image 108 such that the orientation of the input substrate image 108 matches the orientation of the reference substrate image 110. The defect detection process 100 also can scale the input substrate image 108 such that the size of the substrate in the input substrate image 108 matches the size of the substrate in the reference substrate image 110. The defect detection process 100 also may carry out other linear or non-linear transformations to ensure that the positions of the key points in the input substrate image 108 match the positions of the key points in the reference substrate image 110. FIG. 3 shows an example result of image registration of the images shown in FIG. 2. In particular, FIG. 3 shows the result of the defect detection process 100 in the registration stage 116 carrying out the registration operation and rotate the input substrate image 108 such that the input substrate image 108 is in the same orientation as the reference substrate image 110.

The defect detection process 100 in the subtraction stage 118 determines potential defects in the input substrate image 108 based on the comparison with the reference substrate image 110. In some examples, the defect detection process 100 subtracts the reference substrate image 110 from the input substrate image 108 to generate a difference image to identify defects in the input substrate image 108. Referring again to FIG. 3, the input substrate image 108 shows the substrate having a first defect 302, a second defect 304 and a third defect 306. These defects are in the form of metal traces that may undesirably electrically connect two or more interconnects on the substrate. These defects are clearly not present in the reference substrate image 110. Therefore, a difference operation that subtracts the reference substrate image 110 from the input substrate image 108 can reveal the defects.

Figure 4:
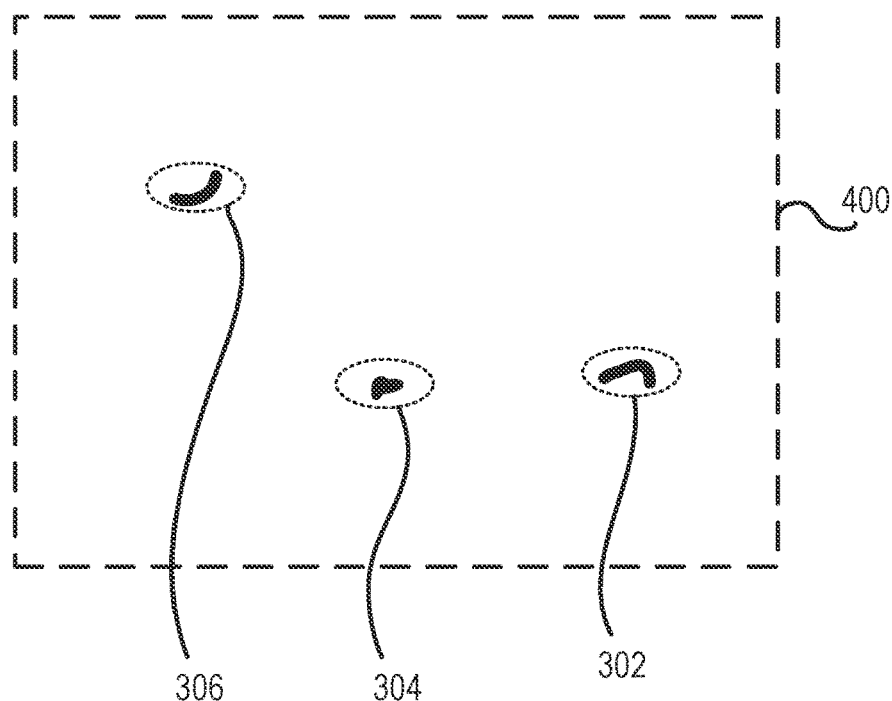
FIG. 4 shows an example difference image that is a result of a difference operation between the input substrate image and the reference substrate image.

FIG. 4 shows an example difference image 400 that is a result of a difference operation between the input substrate image 108 and the reference substrate image 110. The defect detection process 100 subtracts the reference substrate image 110 from the input substrate image 108. As the two images have been aligned during the registration stage 116, all the interconnects or traces on the substrate appearing in the reference substrate image 110 will also appear at the same location in the input substrate image 108. Therefore, the difference image 400 will ideally exclude any interconnects or traces that are present in both the input substrate image 108 and the reference substrate image 110, and include any defects that are only present in the input substrate image 108. Thus, FIG. 4 shows the first defect 302, the second defect 304 and the third defect 306.

In some examples, the input substrate image 108 and the reference substrate image 110 may be originally captured in grayscale or in color. In such instances, a difference of the two images may yield artifacts that can be attributed to color differences rather than to actual defects. To reduce the risks of artifacts, the input substrate image 108 and the reference substrate image 110 can be converted into a binary image prior to carrying out the difference operation. A binary image removes the color information and includes pixels that can have only two colors: typically black and white. The defect detection process 100 can apply a thresholding process to the images to convert the images to respective binary images. The difference image can then be generated from the difference of the binary images.

In some examples, the defect detection process 100 can employ an XOR operation as a difference operation instead of subtraction. When XORing two images, each pixel in a particular location in the first image is XORed with a pixel in the corresponding location in the second image. If the two pixels from the two images at the same location have the same value, the resulting XOR is zero, while if the two pixels have different values, the resulting XOR is a one. The defect detection process 100 can assign intensity values to both the zero (e.g., intensity value 0) and the one (e.g., intensity value 255).

In some examples, despite the best efforts in registering the input substrate image 108 and the reference substrate image 110, minor misalignments may still exist between the images. These misalignments can introduce misalignment related artifacts or noise into the difference image 400. The defect detection process 100 at the filtering stage 120 can process the difference image to remove these artifacts and noise. The defect detection process 100 can carry out morphological operations to remove the noise and artifacts. The morphological operations can include, for example, erosion, which smooths object boundaries, removes peninsulas, fingers, and small objects. This operation can potentially remove small artifacts formed in the difference image. Another morphological operation can include dilation, which expands the size of foreground objects, smooths object boundaries, and closes holes and gaps in the image. An opening operation can be expressed as a combination of first erosion and then dilation operations, while a closing operation can be expressed as a combination of first dilation and then erosion operations. The opening operation can remove small objects from an image, while closing can remove small holes in an image. Opening and closing operations can be effective in reducing noise in the difference image 400.

In some examples, the difference image 400 can include the pixels that correspond to the defects in the input substrate image 108. However, a subset of the pixels when taken together can correspond to a single defect, such as, for example, a short or a spur. For example, referring to FIG. 4, the first defect 302 is represented by a group of pixels, which collectively form the first defect 302. The defect detection process 100 can execute a connected components algorithm to label the pixels corresponding each defect with the same label and group the pixels with the same label as a single defect. The group of pixels that correspond to the same defect can be viewed as a potential defect image region in the difference image 400. Thus, the difference image 400 can include potential defect image regions corresponding to the three defects shown in FIG. 4.

Figure 5:
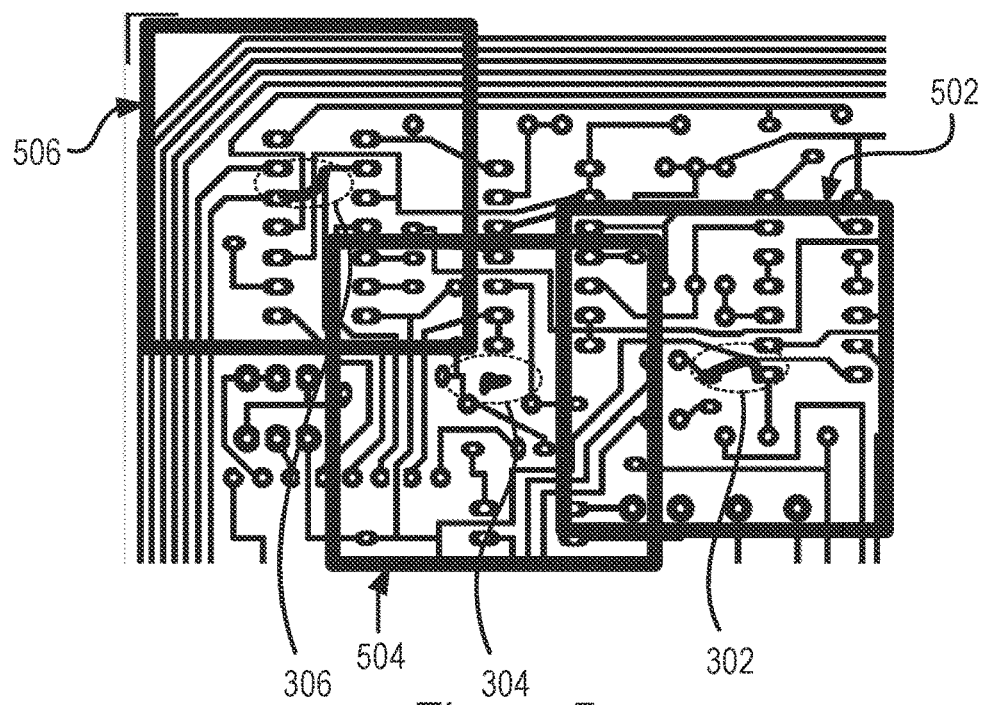
FIG. 5 shows example image patches generated by the defect detection process.

The defect detection process 100 also can generate at least one image patch corresponding to at least one potential defect region in the difference image 400. An image patch can be a portion of the reference substrate image 110 that includes at least one potential defect region. FIG. 5 shows example image patches generated by the defect detection process 100. In particular, FIG. 5 shows a first image patch 502 corresponding to the potential defect image region of the first defect 302, a second image patch 504 corresponding to the potential defect image region of the second defect 304, and a third image patch 506 corresponding to the potential defect image region of the third defect 306. In the example shown in FIG. 5, the image patches are rectangular in shape. However, the image patches can have other shapes such as circular, elliptical, square, and polygonal (regular or irregular). In some examples, the defect detection process 100 can center the defect within the image patch. The defect detection process 100 may alternatively merely ensure that the defect is within the perimeter of the image patch.

The defect detection process 100 can further process the image patches in the defect presence classifier stages 104. The defect presence classifier stages 104 can include, for example, a first defect presence classifier stage 104a and a second defect presence classifier stage 104b. While FIG. 2 explicitly shows only two defect presence classifier stages, it is understood that more than two stages can be utilized. In some examples, at most 10 stages can be used Each defect presence classifier stage 104 can process an image patch and provide an outcome that indicates whether the image patch includes or does not include a defect. In other words, each defect presence classifier stage 104 can indicate whether the image patch is "good" or "bad". From the set of image patches processed, the defect presence classifier stage 104 identifies a subset image patches that are "bad". Each defect presence classifier stage 104 can include a trained model 122, a tessellation process 124 and a classification stage 126.

Figure 6:
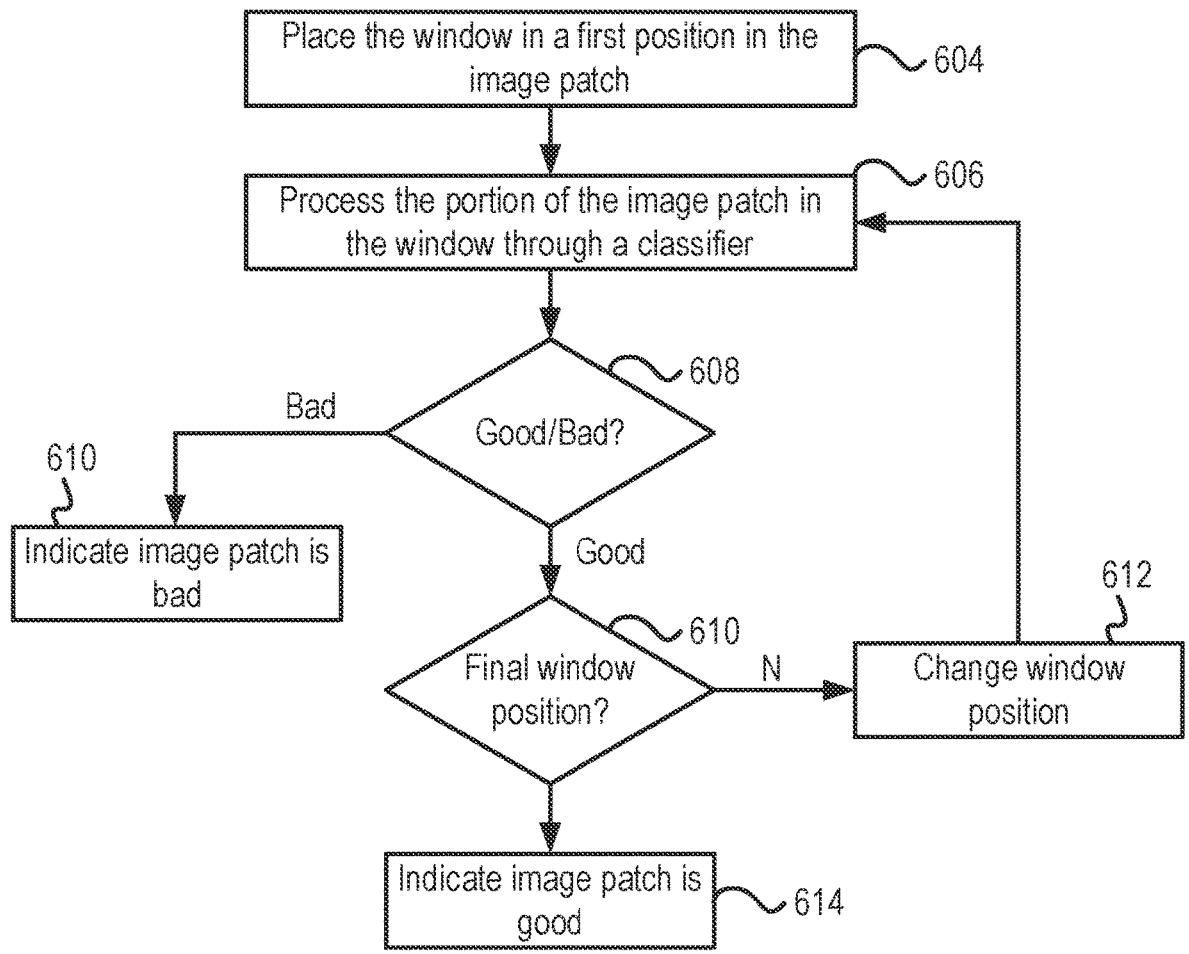
FIG. 6 shows a flow diagram of an example process executed by the defect detection process at a defect presence classifier stage.
Figure 7:
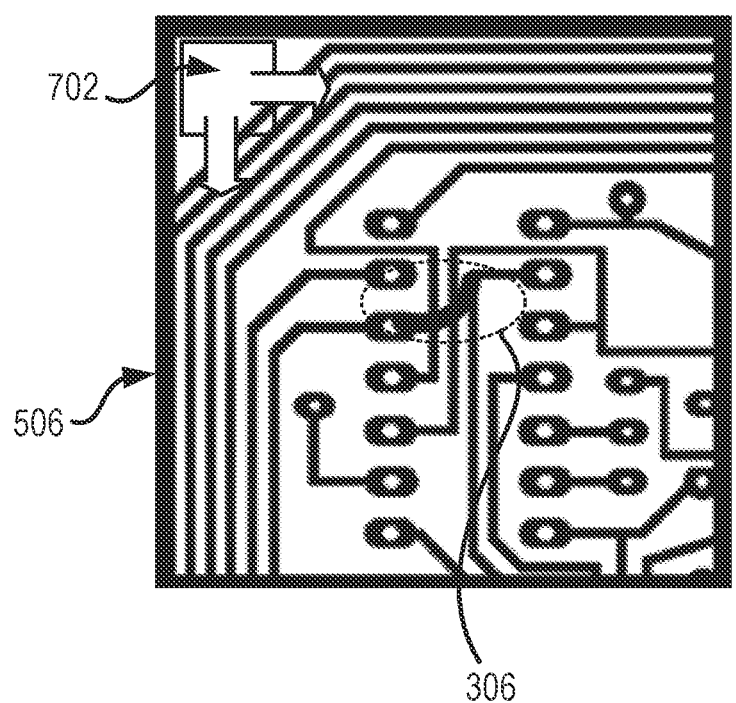
FIG. 7 shows an example tessellation process on an image patch.

FIG. 6 shows a flow diagram of an example process 600 executed by the defect detection process 100 at a defect presence classifier stage 104. The process 600 includes identifying a window at a first position in the image patch. FIG. 7 shows an example tessellation process on an image patch. In particular, FIG. 7 shows the third image patch 506 including the third defect 306. The process 600 includes positioning a window within an image patch (604). For example, FIG. 7 shows positioning the window 702 within the third image patch 506. In the example shown in FIG. 7, the window 702 is positioned in the top left corner of the third image patch 506. However, the window 702 can be positioned anywhere in the third image patch 506. The process 600 further includes processing the portion of the image patch in the window through a classifier (606). Referring again to FIG. 7, the portion of the third image patch 506 within the window 702 can be processed through a classifier that can determine whether that portion includes a defect or does not include a defect. The classifiers used to process the portion of the image patch are discussed further below. The classifier can indicate whether the portion is either good or bad (608). If the classifier determines that the portion of the image patch is bad, that is, the classifier determines with high probability that the portion of the image patch includes a defect, the process 600 can label the image patch as bad, and include the image patch in the set of image patches that potentially include a defect (610).

If the classifier determines that the portion of the image patch within the window is good, then the process 600 determines whether the current position of the window is its final position (610). The position of the window would be its final position if it has traversed the entire image patch. If the position of the window is not its final position, then the process 600 can change the position of the window to its next position (612) and process the portion of the image patch within the new position of the window though the classifier. Referring again to FIG. 7, the window 702 can be moved to a different position along the x-direction or the y-direction or any other direction. The window 702 may also be randomly moved to a different position within the image patch. The process 600 in the above manner can continuously reposition the window 702 within the third image patch and classify the corresponding portion of the image patch until the classifier determines a "bad" portion in the portion of the patch, or the window reaches its final position in the image patch. If the window 702 reaches its final position and the classifier has not determined a single "bad" portion, then the process 600 can label the image patch is being "good", and not include it in the set of image patches that potentially include a defect.

The process can select the size of the window 702 based on the potential size of the defects. In some examples, the process 600 can select the size of the window to be between about 128×128 pixels to about 1024×1024 pixels. However, these are only examples, and the process 600 can determine the window size based on the expected sizes of the defects such that the window can circumscribe a significant portion (at least 75%) of the defect or the defect completely. In some examples, the process 600 can implement a number of window sizes to detect defects of various sizes. For example, the defect detection process 100 can execute the process 600 for each of several window size and determine whether there is any change in the number of defects detected and can narrow down to one or more window sizes for which the process 600 is executed. Defects in substrate can have a small scale in relation to the substrate itself. In such cases, classifiers that process the entire image of the substrate may not be able to detect the relatively small defects in the substrate, thereby reducing the accuracy of the defect detection process. The defect detection process 100 on the other hand, uses a window to focus the classification on a smaller portion of the substrate image. Thus, the classifier can more accurately determine wither the portion of the substrate image that is within the window is a defect.

Figure 8:
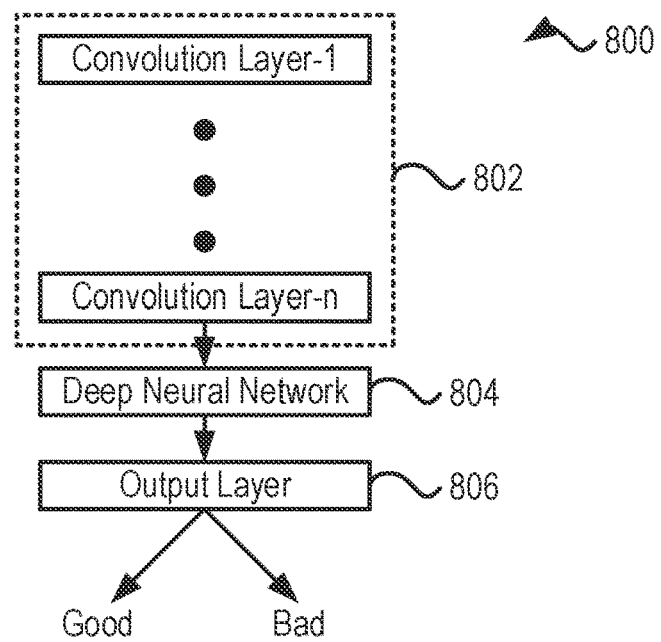
FIG. 8 shows a first example classifier that can be used to implement the classification stage shown in FIG. 1.

Referring again to FIG. 1, the defect presence classifier stages 104 can utilize classifiers to classify an image patch as having a defect. In some examples, the defect detection process 100 can include classifiers based on artificial neural networks. For example, the defect detection process 100 can include classifiers based on convolution neural networks. FIG. 8 shows a first example classifier 800 that can be used to implement the classification stage 126 shown in FIG. 1. Specifically, the first example classifier 800 is a binary classifier based on the convolutional neural network (CNN) architecture. The binary classifier can be trained on a labeled dataset of portions of images of the substrates, like the input substrate image 108. In some examples, the binary classifier can be trained on a few thousands to 100s of thousands of labeled substrate images that can be collected during implementation. The binary classifier may also be pre-trained on a different set of images. The pre-training images can include publicly available labeled images such as, for example, those available from IMAGENET (http://imagenet.org). The images can be labeled as "good" or "bad" or in some instances, "no defect" or "defect." These labels are only examples, and any two distinct labels can be used. The first example classifier 800 can include a set of convolution layers 802 (e.g., convolution layer-1 to convolution layer-n), followed by a deep neural network 804 and an output layer 806. The convolution layers 802 can be trained on the labeled image dataset discussed above to learn to represent spatial features of the images that correspond to "good" and "bad" labels.

Each convolution layer in the set of convolution layers 802 can have a respective number of filters, kernel sizes, stride lengths, and paddings. The number of convolution layers, the number of filters, the kernel sizes, stride lengths, and paddings can be selected based on the particular implementation as such factors can be selected based on the desired level of accuracy and the available computational resources. As an example, the set of convolution layers 802 can include 2 to 50 convolution layers. In some examples, the number of filters can vary between about 64 to about 1024 through the convolution layers and can increase with depth. In some instances, the number of filters can increase by the power of two with each convolution layer. In some examples, the kernel size can vary between one and seven. In some instances, the kernel size is kept constant throughout the convolution layers, while in some instances the kernel size can vary. The stride can be set, for example, to be equal to one to maintain the lattice size of the previous layer or can be set, for example, to be equal to two to down sample. Image padding can be used to match the output lattice size to that of the previous layer or to grow the input layer by, for example, one or a few pixels on each side of the image. In some examples, the set of convolution layers 802 may also include pooling layers positioned between convolution layers to reduce the size of activation maps associated with the convolution layers but maintain depth. This can reduce the computational complexity of the first example classifier 800. As mentioned above, the set of convolution layers 802 can learn to represent spatial features within the image data. The convolution layer-1 can learn to represent simple features like lines at certain angles. The subsequent convolution layers can learn to recombine these simple features into more complex features.

The output of the set of convolution layers 802 can be flattened and provided to the deep neural network 804, which can include one or more dense hidden layers. As an example, the deep neural network 804 can include two or more layers where each layer includes a set of neurons (e.g., 4 to 128) with a selected activation (e.g., tanh, ReLU, etc.). The deep neural network 804 hyperparameters values can be determined during training on the above-mentioned image set for the binary classifier. The deep neural network 804 can recombine the complex features in ways that is optimal for distinguishing the "good" images form the "bad" images. That is, the deep neural network 804 can map the spatial features learned by the set of convolution layers 802 to one of the two class of images. The deep neural network 804 can include a number of inputs that is equal to the flattened output of the preceding set of convolution layers 802. The output layer 806 can be a softmax layer with two artificial neurons that output the determination of whether the image is a good image or a bad image.

The CNN architecture of the set of convolution layers 802 can include residual network architectures such as, for example, ResNet. Residual network architectures include a series of residual modules, each one of which includes a sequence of convolution layers, batch-normalization operations, and ReLU activations that culminates with a residual connection. Traditional CNNs can suffer from vanishing gradients when the number of convolution layers is increased. Residual network architectures alleviate the vanishing gradient problem by utilizing a "skip connection" that adds output of a previous residual module to the output of the current residual module. Common residual networks such as ResNet-18, ResNet-34, ResNet-50, ResNet-101 can be used.

Figure 9:
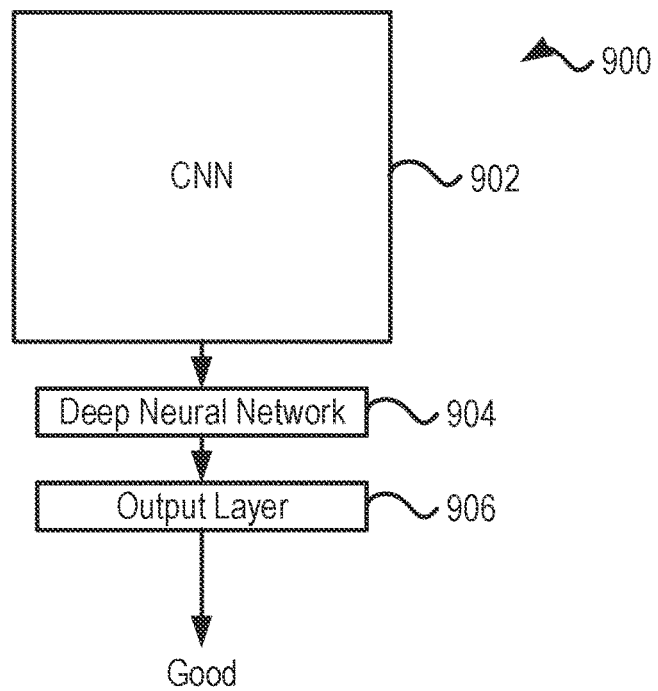
FIG. 9 shows a second example classifier that can be used to implement the classification stage shown in FIG. 1.

FIG. 9 shows a second example classifier 900 that can be used to implement the classification stage 126 shown in FIG. 1. The second example classifier 900 can include a set of convolution layers 902, a deep neural network 904, and an output layer 906. The set of convolution layers 902 and the deep neural network 904 can be similar to the set of convolution layers 802 and the deep neural network 804 discussed above in relation to the first example classifier 800 shown in FIG. 8. However, unlike the first example classifier 800, which can be trained not on two sets of images-one set including images labeled "good" and another set including images labeled "bad"—the second example classifier 900 is instead trained on only "good" images. To that end, the output layer 906 can be configured to output a level of confidence associated with the input image being "good". For example, the output layer 906 can output a probability (0 to 1) that the input image is good. The second example classifier 900 can then include compare the output to a threshold value to determine whether the input image is "good" or "bad". The second example classifier 900 can be viewed as an anomaly detector, where the classifier is trained on "good" images, and outputs a value that is above a threshold value when the input image is "good" and outputs a value that is below a threshold value when it detects an anomaly (i.e., a bad image).

Figure 10:
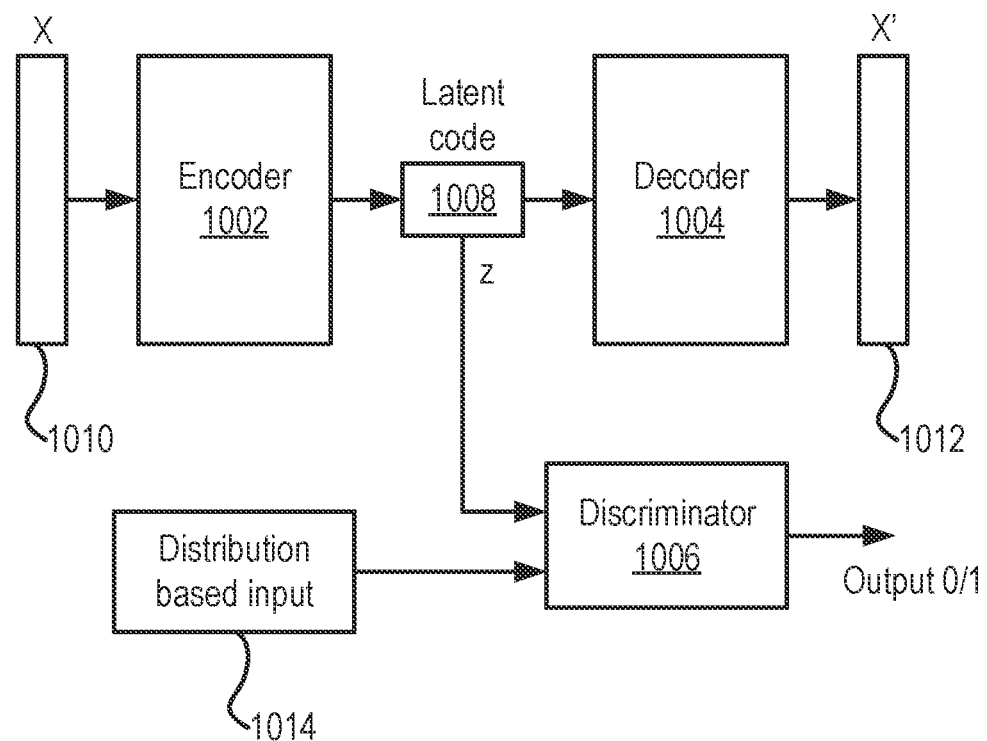
FIG. 10 shows a third example classifier that can be used to implement the classification stage shown in FIG. 1.

FIG. 10 shows a third example classifier 1000 that can be used to implement the classification stage 126 shown in FIG. 1. The third example classifier 1000 can be based on an adversarial autoencoder architecture. An autoencoder is a neural network that is trained to produce an output that is similar to its input. The autoencoder can be trained on unlabeled images, and therefore can be trained in an unsupervised manner. The third example classifier 1000 can include an encoder 1002, a decoder 10004, and a discriminator 1006. The encoder 1002 receives an input image X 1010 and produces a latent code 1008, where the latent code 1008 can have a lower dimensionality than the input image X 1010. The latent code 1008 can be represented by an output z where z=q(X), and q( ) is the function representing the encoder 1002. The decoder 1004 receives the latent code 1008 and generates an output image X' 1012, with the aim that the output image X' 1012 is as close as possible to the input image X 1010. The output of the decoder 1004 can be represented by X'=p(z), where p( ) is the function representing the decoder 1004. The discriminator 1006 can be similar to the discriminators used in generative adversarial networks (GANs).

The discriminator 1006 and the encoder 1002 are trained to capture the features of the input images X in the latent code 1008. Once trained, the encoder 1002 effectively generates the latent code 1008 that is a feature representation of the images on which the encoder 1008 is trained with a desired distribution. The decoder 1004 then generates the output image X' 1012 that is a close reproduction of the input image X 1010. When an input image X 1010 that includes a defect is input to the encoder 1010, the presence of the defect will cause the latent code 1008 to be different from the one corresponding to a defect free image. As a result, the decoder 1004 generates an output image 1012 that is not a faithful reconstruction of the original defect free image. The reconstruction error at the output of the decoder can be used to determine whether the input image has a defect.

The third example classifier 1000 can be trained in two phases. In the reconstruction phase, both the encoder 1002 and the decoder 1004 are trained to minimize the reconstruction loss (e.g., a mean squared error between the input image X 1010 and the output image X' 1012). The training images (which need not be labeled) are input to the encoder 1002, which generates the corresponding latent code 1008. The latent code 1008 is input to the decoder 1004 to generate the output image similar to the input image. Backpropagation is performed through both the encoder 1002 and the decoder 1004 weights such that the reconstruction loss is reduced. In the regularization phase, the discriminator 1006 and the encoder 1002 are trained. The discriminator 1006 is trained to classify the encoder 1002 output—the latent code 1008—and a random input 1014 (having a desired distribution, such as, e.g., normal distribution with mean 0 and standard deviation of 3). The discriminator 1006 will produce an output 1 when the input is from the desired distribution, and 0 when the input is the latent code 1008. The encoder 1002 can be trained to output the latent code 1008 with the same distribution as the desired distribution. For example, images are provided to the encoder 1002 and the generated latent code 1008 is provided to the discriminator 1006 with a target output of 1. The output of the discriminator 1006 is used to determine the loss, and the backpropagation is performed through the encoder 1002 weights only. This causes the encoder 1002 to learn to generate the latent code 1008 that has the desired distribution. Once the autoencoder is trained, the autoencoder can be used to detect whether an input image has a defect or does not have a defect based on the value of the reconstruction error being above or below a threshold value (which can be selected based on the implementation).

The third example classifier 1000 can be trained with size of dataset that can be relatively smaller than the size of datasets used in other classifiers. As a result, the total time required for training as well as resources required for training the classifier can be reduced.

Referring again to FIG. 1, as discussed above, the classification stage 126 can be implemented to determine whether the image input to the first defect presence classifier stage 104a has a defect or does not have a defect. The first defect presence classifier stage 104a receives a set of image patches output by the image processing stage 102, and identifies a subset image patches that are "bad". These subset of image patches identified as "bad" can be passed on to subsequent one or more defect presence classifier stages. For example, the subset of image patches identified as "bad" by the first defect presence classifier stage 104a can be provided to the second defect presence classifier stage 104*b*, which further processes the subset of image patches. The classification stage 126 is configured such that the defect presence classifier stages are progressively more complex. The increase in complexity can correspond to an increase in accuracy, such that every defect presence classifier stage can be more accurate than a previous stage. One or more parameters of the defect presence classifier stages can be varied to increase the accuracy of the stages. The parameters can include, for example, size of the datasets used for training, wider architectures, deeper architectures, etc.

Referring to FIG. 1, the second defect presence classifier stage 104*b* can be trained with an image dataset that is relatively larger than the image dataset used to train the first defect presence classifier stage 104*a*. This increase in the size of the dataset can result in a corresponding increase in the accuracy of the classification stage 126 of the corresponding defect presence classifier stage. The width parameter of the classification stage 126 can correspond to the number of neurons used in one or more stages in the neural network. For example, increasing the width parameter can corresponding to increasing the number of filters in one or more convolution layers in the classification stage 126. Again, this increase in the number of filters can correspond to an increase in the number of features captured by the classification stage 126 during training. As a result, the accuracy of the classification stage 126 can be increased with an increase in the width of the classification stage 126. The depth parameter of the classification stage 126 can correspond to the number of layers in the neural network. For example, the depth of the classifier stage 126 can be increased by increasing the number of convolution layers in the CNN. An increase in the depth of the neural network can also increase the accuracy of the classifier stage 126.

Progressively increasing the accuracy of the defect presence classifier stages can reduce the size of the set of the image patches that have a defect. For example, the first defect presence classifier stage 104*a* can generate a subset of image patches from the set of image patches received from the image processing stage, where the subset of image patches correspond to those image patches that have been identified as having a defect. This subset of image patches is provided to the second defect presence classifier stage 104*b*, which, because if the improved accuracy, can further reduce the size of the subset prior to providing the image patches to the defect characterization stage 106. That is, the second defect presence classifier stage 104*b* with improve accuracy can determine that one or more of the image patches identified by the first defect presence classifier stage 104*a* do not in fact include a defect. As a result, the number of image patches that the defect characterization stage 106 has to process is reduced, thereby reducing the amount of time or processing power needed to determine the defect type.

The number of defect presence classifier stages can be based on the degree of accuracy desired and the cost of adding additional defect presence classifier stages. In particular, the cost of adding additional defect presence classifier stages can manifest as increase in processing time and/or increase in computational resources. Thus, there is a trade-off between the desired accuracy and the associated costs of adding additional stages. As mentioned above in relation to FIG. 1, the total number of stages may be in the range of about 2 to about 10.

In some examples, the defect detection process 100 can dynamically determine the number defect presence classifier stages. The defect detection process 100 can monitor a set of classification criteria during defect detection, and accordingly increase or decrease the number of defect presence classifier stages. The classification criteria can include, for example, the desired level of accuracy, the reduction in the number of image patches over various stages, available computing resources, etc. For example, if the desired level of accuracy at the last of the defect presence classifier stages 104 is below a desired value, the defect detection process 100 can dynamically add an additional defect presence classifier stage with improved accuracy. Similarly, if the desired level of accuracy is reached by an intermediate defect presence classifier stage, the defect detection process 100 can dynamically remove stages after that intermediate defect presence classifier stage. In some examples, the defect detection process 100 can monitor the number of image patches that are identified as having a defect at the output of each defect presence classifier stage. If number stops reducing at an intermediate defect presence classifier stage, the defect detection process 100 can remove stages after that intermediate defect presence classifier stage. Similarly, the defect detection process 100 can progressively add one or more defect presence classifier stages until the number of image patches identified as having a defect at the output of each added stage ceases to reduce. In some examples, the defect detection process 100 can monitor the amount of time it takes to process the image patches. If the amount of time is greater than a desired threshold value, the defect detection process 100 can reduce the number of defect presence classifier stages. Similarly, if the defect detection process 100 detects the availability of additional computational resources, the defect detection process 100 can add additional defect presence classifier stages to utilize the additional computational resources without impacting the total time needed to process the image patches.

Referring again to FIG. 1, the output of the defect presence classifier stage 104 is a number of image patches identified by the defect presence classifier stage 104 as having at least one defect. These image patches can be subsequently processed by the defect characterization stage 106 to determine the type, location, and size of the defect. In some examples, defect types can include those listed in the IPC-6011 Generic Performance Specification for PCBs. However, different or additional defect types can also be specified. The defect types can include those defects that can impact the performance of the substrate as well as those that impact the cosmetic condition of the substrate. For example, some defect types can include annular rings, solder joints, and component misalignments. The defect characterization stage 106 also can determine the location and the size of the defects. For example, the location of the defect can be provided in reference to the location in the reference substrate image 110. The size of the defect can be provided in terms of a bounding box having a width and a height. In some instances, the defect characterization stage 106 can associate a defect class label with each pixel forming the defect in the image. This provides relatively higher accuracy, compared to the bounding box, in the size and location of the defect in the image.

Figure 11:
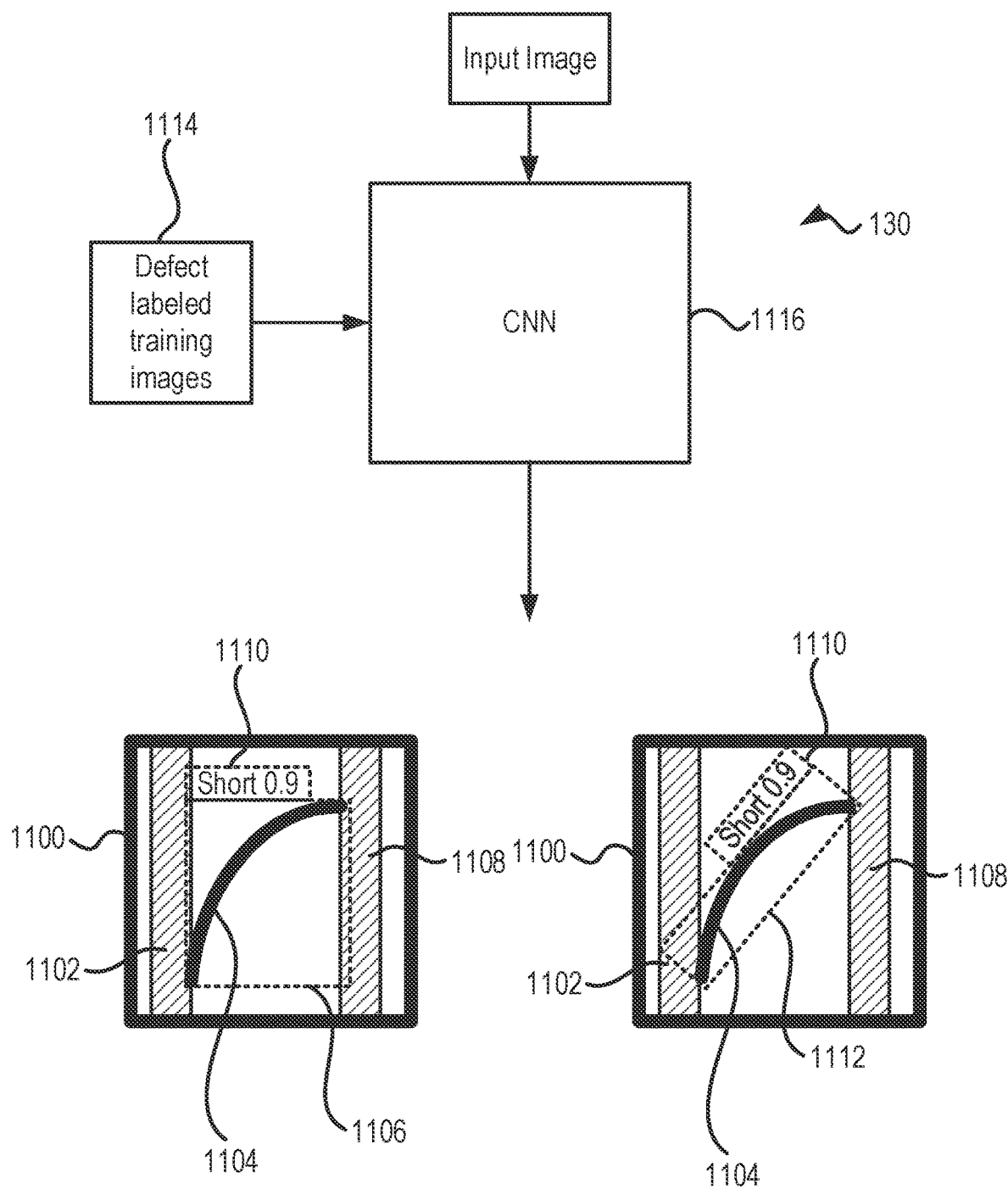
FIG. 11 shows a first example implementation of a defect detection stage shown in FIG. 1.

The defect characterization stage 106 can include a defect detection stage 130 and a defect segmentation stage 132. The defect detection stage 130 can detect defects and classify the detected defects in the image patch. For example, the defect detection stage 130 can generate a bounding box around the detected defect and provide a label that classifies the type of defect. FIG. 11 shows a first example implementation of a defect detection stage 130 shown in FIG. 1. The defect detection stage 130 can include a CNN configured for object detection. Object detection can generally include a detection step (identifying the location of the objects in the image) and a classification step (identifying what the detected objects are). In some examples, the object detection can include three stages: 1. Identifying a region of interest (ROI), 2. Automatically extracting features within the ROI, and 3. Classifying the ROI. Any of the several known object detection architectures can be utilized to implement the defect detection stage 130. Such architectures can include, for example, R-CNN, Fast R-CNN, Faster R-CNN, You Only Look Once (YOLO), EfficientDet, etc. The CNN 1116 can be similar to the CNNs discussed above in relation to FIGS. 8 and 9 and can include convolution layers followed by deep neural networks and an output layer. The convolution layers are focused to extract features from the ROI in the received image. The deep neural networks can then determine whether the combination of features appear within the ROI, and the output stage can include a softmax layer with probability output over several classes. The CNN 1116 can be trained on a set of labeled images 1114, where each label corresponds to the type of defect in the training image. The set of labeled images 1114 can include images (thousands to hundreds of thousands) of substrates of different colors and sizes. Each image can include annotations marking the regions with defects and the type of the defect. The images may also identify good regions with corresponding markings.

The possible outputs of the defect detection stage 130 are also shown in FIG. 11. As an example, on the left, an image 1100 is processed by the defect detection stage 130. The image 1100 can be an image patch discussed previously. The image 1100 includes a defect 1104 positioned between a first interconnect 1102 and a second interconnect 1108. The defect detection stage 130 can generate a first bounding box 1106 and a label 1110 indicating the type of defect and the probability output associated with the type of defect. For the example shown in FIG. 11, the defect detection stage 130 identifies the defect 1104 as a "Short" with the probability output of 0.9. The image on the right can be an alternative output of the defect detection stage 130. In particular, a second bounding box 1112 around the defect 1104 is more tightly bound to the defect 1104. The second bounding box 1112 can provide a more accurate size of the defect 1104 than the first bounding box 1106, as the second bounding box 1112 is rotated and oriented along a longitudinal axis of the defect 1104. The size of the defect 1104 can be determined by the size of the bounding box. Thus, the size of the image with the first bounding box 1106 can be equal to the height and the width of the first bounding box 1106, while the size of the defect 1104 with the second bounding box 1112 can be the height and width of the second bounding box 1112. The height and the width of the bounding boxes can be expressed in terms of pixels, and then can be converted into SI units by factoring in the size of the pixel. For example, if the size of a single pixel is 0.01 nm, then that value can be multiplied with the height and with the width (in pixels) of the bounding box to obtain the size of the defect.

Figure 12:
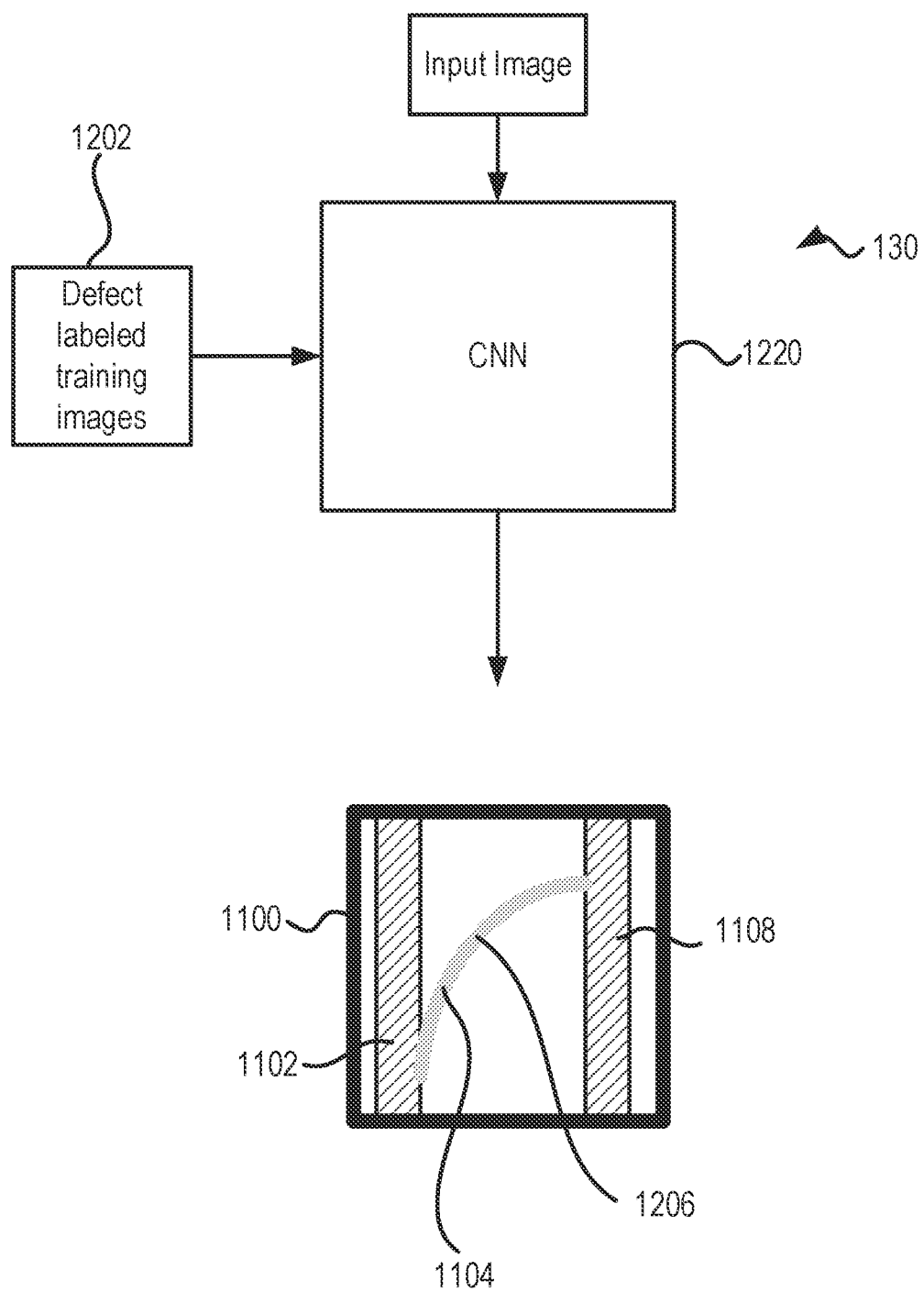
FIG. 12 shows a second example implementation of the defect detection stage shown in FIG. 1.

FIG. 12 shows a second example implementation of the defect detection stage 130 shown in FIG. 1. In particular, FIG. 12 shows the second example implementation using image segmentation. Image segmentation can be a process by which sections of an image can be partitioned into regions of particular type or class. The second example implementation, similar to the first example implementation shown in FIG. 11, can include a CNN 1220. Any of the several known image segmentation architectures can be utilized to implement the defect detection stage 130. Such architectures can include, for example, Mask R-CNN, U-Net, BlitzNet, etc. The CNN 1220 can be trained using binary masks as labels associated with images. The binary masks can include arrays of the same dimension as the original image. The arrays can include binary values (e.g., 0s and 1s) indicating the location of the object in the image. For example, is can be included in the positions in the array corresponding to the positions where the object appears in the original image. The remainder of the array is filled with 0s. Each object as an associated mask. Thus, each class of defect can include an associated mask on which the CNN 1220 can be trained. the CNN 1220 can be trained to extract the features based on a set of images including defects and the corresponding binary masks as labels. When an input image including a defect is provided to the CNN 1220, the CNN 1220 can output a pixel mask, where pixels over the purported defect can be labeled with the type of defect detected. The pixel mask (shown in FIG. 12 in a shade of gray) provides the finest granularity for estimating the size of the defect. The size of the defect can be determined based on the number of pixels covering the defect and the size of a single pixel in the image. For example, the size of the defect can be determined based on a pixel-wise perimeter labeled with the type of defect.

In some examples, the defect detection and the image segmentation discussed above in relation to FIGS. 11 and 12 can be implemented on the same neural network. In particular, instead of training separate CNNs for the two tasks, a single CNN that allows for sharing of weights can improve the accuracy of both tasks. Both the defect detection and the image segmentation networks can share the same image feature encoder network with a separate decoder network head for each output. For example, one decoder network that outputs bounding box locations and another that outputs pixel level segmentation masks. Provided training images with labeled defect bounding boxes and image label masks, the decoder heads are trained jointly together with the feature encoder network typically using a multi-stage approach whereby the heads are trained first followed by fine-tuning of the full network. During inference, the trained network outputs both the defect detections and their segmentation masks. This approach improves efficiency because the bulk of the computation is performed by the image encoder network which is now shared by both the detection and image segmentation networks.

Figure 13:
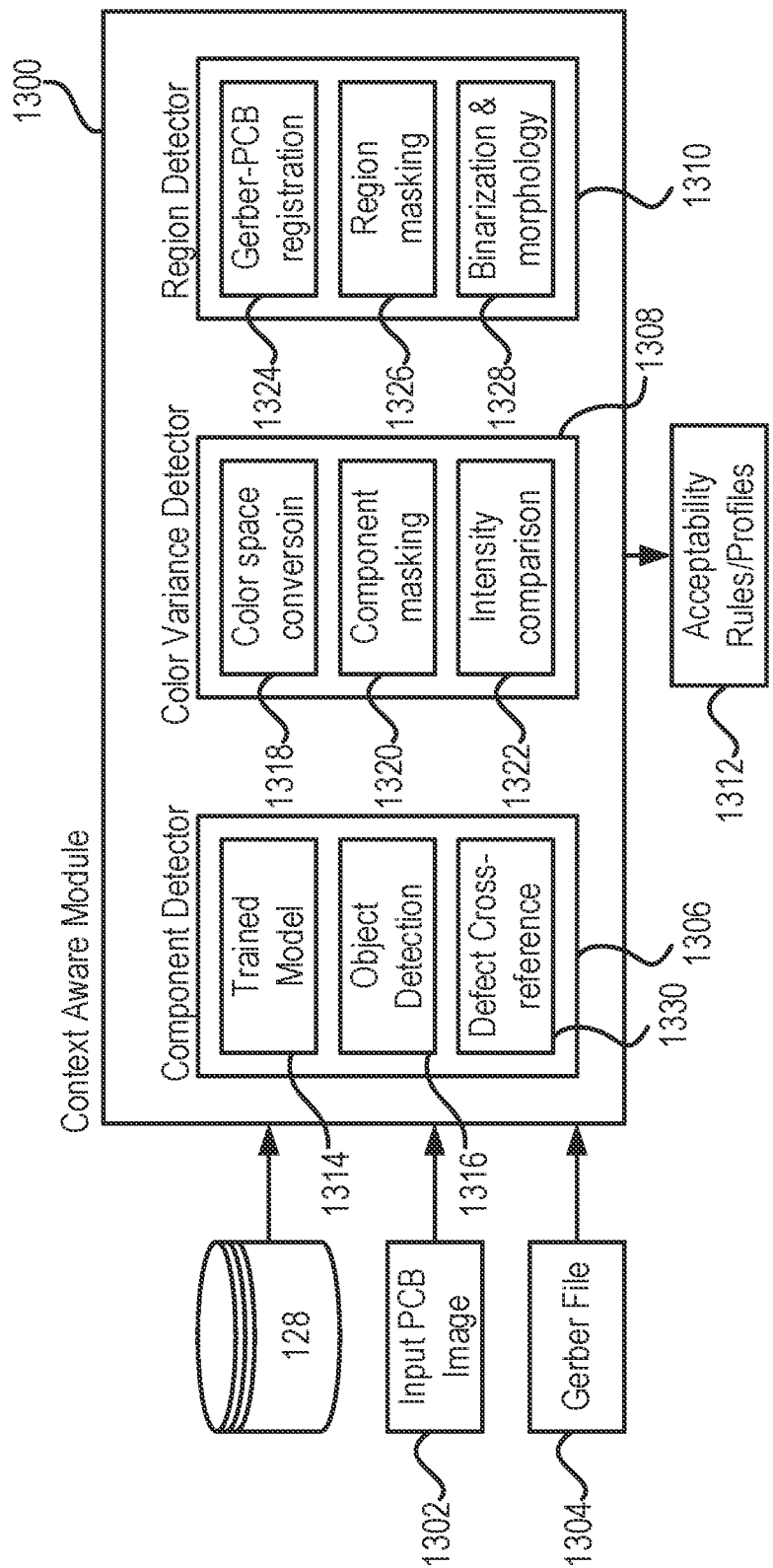
FIG. 13 shows a block diagram of an example context aware module.

FIG. 13 shows a block diagram of an example context aware module 1300. The context aware module 1300 can provide additional functionality to the defect detection process 100 discussed herein. Specifically, the context aware module can determine the significance of the defects detected by the defect detection process 100. Most defect detection systems merely determine the type of defect on the substrate, but do not provide the level of severity of the defect. The severity of the defect depends not only on the type of defect, but also on the location of the defect on the substrate. Most defect detection systems also do not assess the substrate as a whole. For example, a substrate could be defect-free, but still not meet desired standards of color variability on the surface of the substrate.

The context aware module 1300 can detect critical regions of the substrate where, if defects were present, could deteriorate the performance of components mounted in those regions. Critical regions can include, for example, surface mount areas used for mounting expensive integrated circuits. The context aware module 1300 also can distill the substrate description files to focus on the desired layers of the substrate and the defects therein.

The context aware module 1300 includes a component detector 1306 a color variance detector 1308 and a region detector 1310. The component detector 1306 can detect critical regions on the substrate and determine whether any of the defects detected by the defect detection process 100 affect the critical regions. The color variance detector 1308 detects whether color variance over the surface of the substrate is above a desired value. The region detector 1310 can generate images form a substrate description file (such as, e.g., a Gerber file) of isolated components or layers of the substrate and determine whether any defects occur at the particular components or layers.

The context aware module 1300 can receive information on the type, size, and location of the defects detected by the defect detection process 100 from the database 128. The context aware module 1300 also can receive the input substrate image 108 and Gerber files 1304 of the reference substrate as well as the input substrate. The component detector 1306 can include a trained model 1314 for object detection 1316. The object detection 1316 can be similar to the defect detection stage 130 discussed above in relation to FIG. 11. However, unlike the defect detection stage 130, which detected defects, the object detection 1316 in FIG. 13 detects critical areas in the substrate. These critical areas can include regions such as integrated circuit mounts, ball grid arrays, etc. To that end, the trained model 1314 can be trained on a dataset of images that include the critical areas along with labels that identify the critical areas. The object detection 1316 can detect the location of the critical areas on the substrate in a manner similar to the bounding boxes discussed above in relation to FIG. 11. For example, the context aware module 1300 can store a data object associated each critical area identified on the substrate. The data object can include, for example, a location of the critical area (e.g., x-y coordinates of a corner of a bounding box), a size of the critical area (e.g., the size of the bounding box, locations of set of pixels associated with the critical area, etc.), the type of the critical area (e.g., ball-grid array, power supply trace, etc.) and any other attributes associated with the critical area. The component detector 1306 can then cross-reference the locations of the critical areas with the locations and sizes of the defects included in the database 128. If any defect is determined to be present at one or more critical areas, the component detector 1306 can generate a message indicating the details of the defect and the critical area.

The manufacturing process of the substrate can introduce undesirable color variations on the surface of the substrate. The color variance detector 1308 can include a color space conversion stage 1318, a component masking stage 1320, and an intensity comparison stage 1322. The color space conversion stage 1318 can convert the input substrate image 108 into an appropriate color space such as, for example, the hue-saturation-value (HSV) color space, the cyan-magenta-yellow (CMY) color space, the CIE XYZ color space, etc. The component masking stage 1320 can read the Gerber file to mask out various regions of the converted image that corresponds to components such as traces, solder mask, and print regions. The intensity comparison stage 1322 can determine intensity variations between various regions of the image. For example, the intensity comparison stage 1322 can determine a mean local intensity variation or an average pixel intensity in various portions of the image. The intensity comparison stage 1322 can determine the various portions, for example, based on a grid where each section of the grid corresponds to a portion, and the intensity comparison stage 1322 can determine the average intensities in each portion in the gird, and compare the average intensities across the various portions in the grid to determine local intensity variations. In some examples, the intensities can be determined in grayscale or within each channel of the color space. The intensity comparison stage 1322 can then determine if these values exceed a predetermined threshold. If the values exceed the threshold values, the color variance detector 1308 can indicate that there is undesirable color variation in the input substrate.

The region detector 1310 can display visual indications of the presence of defects in regions of interest in the substrate. The region detector 310 includes a Gerber-PCB registration stage 1324, a region masking stage 1326, and a binarization and morphology stage 1328. The Gerber-PCB registration stage 1324 aligns the images of the defects with the image of the substrate. In particular, the database 128 provides not only the images of the defects, but also the size and locations of those defects in the reference substrate image 110. The Gerber file of the reference substrate image 110 can include information of various layers and their locations on the substrate. The Gerber-PCB registration stage 1324 can map the location information of the defects to superimpose the images of the defects at their appropriate locations on the substrate image. The substrate image can be obtained from converting the Gerber file to an image using commonly used converters or can utilize the location information in the Gerber file to position the defects at the correct location on the reference substrate image 110. The region detector 1310 can receive user input specifying the region of interest in the reference substrate image 110. For example, the user may be interested in viewing defects only in certain layers of the substrate, or in certain regions of the substrate. The Gerber file can include information about these layers and regions. The region masking stage 1326 can mask the regions or layers in the reference substrate image 110 that are not in the region of interest and overlay the defect images on the regions of interest. The binarization and morphology stage 1328 can convert the images to display a binarized (two intensity levels) version of the regions of interest with overlayed defect images. The binarization and morphology stage 1328 also can carry out morphology operations, similar to those discussed above in relation to the image processing stage 102, to filter the image to remove noise or undesired image artifacts.

The acceptability rules/profiles stage 1312 can store rules and profiles that comport with quality control and acceptability standards of the particular vendor. These rules and profiles can vary from application to application and from vendor to vendor. For example, a defect in the ball grid array portion of the substrate may be critical in some applications, while not critical in other applications. The acceptability rules/profiles stage 1312 can receive logical input from the component detector 1306, the color variance detector 1308 or the region detector 1310 indicting their respective outcomes. For example, the component detector stage 1306 can provide a logical output indicating that one or more defects appear in specific areas, such as ball grid arrays, of the substrate. The acceptability rules/profiles stage 1312 can store rules indicating whether the ball grid array is a critical area, and the action to be taken if defects are detected in that area. The acceptability rules/profiles stage 1312 can generate an output based on the rules or profiles and the received output from the component detector 1306. The acceptability rules/profiles stage 1312 can receive the information of the defects that are in the critical areas and the data objects associated with the critical areas. The acceptability rules/profiles stage 1312 can determine the severity of the defects based on at least one of a degree of overlap between the defect and the critical areas or the type of defect. For example, the acceptability rules/profiles stage 1312 can determine a percentage of overlap between the area of the defect (e.g., based on the location and the bounding box size of the defect or the size of the pixel-wise perimeter surrounding the defect) and the area of the critical area (e.g., based on the location of the critical area and the size of bounding box or the pixel-wise perimeter surrounding the critical area). The acceptability rules/profiles stage 1312 can then base the severity on the percentage of overlap. In some examples, the acceptability rules/profiles stage 1312 can determine the type of the defect (e.g., short) and the type of the critical area (e.g., ball grid array, power supply or ground trace, etc.). The acceptability rules/profiles stage 1312 can store in memory a set of combinations of the type of defect and the type of critical area and associated severity level. Based on matching with the stored combinations, the acceptability rules/profiles stage 1312 can determine the severity of the defect. In some examples, the acceptability rules/ profiles stage 1312 can determine the severity of the defect based on the combination of the degree of overlap and the type combinations (e.g., weighted sum).

Figure 14:
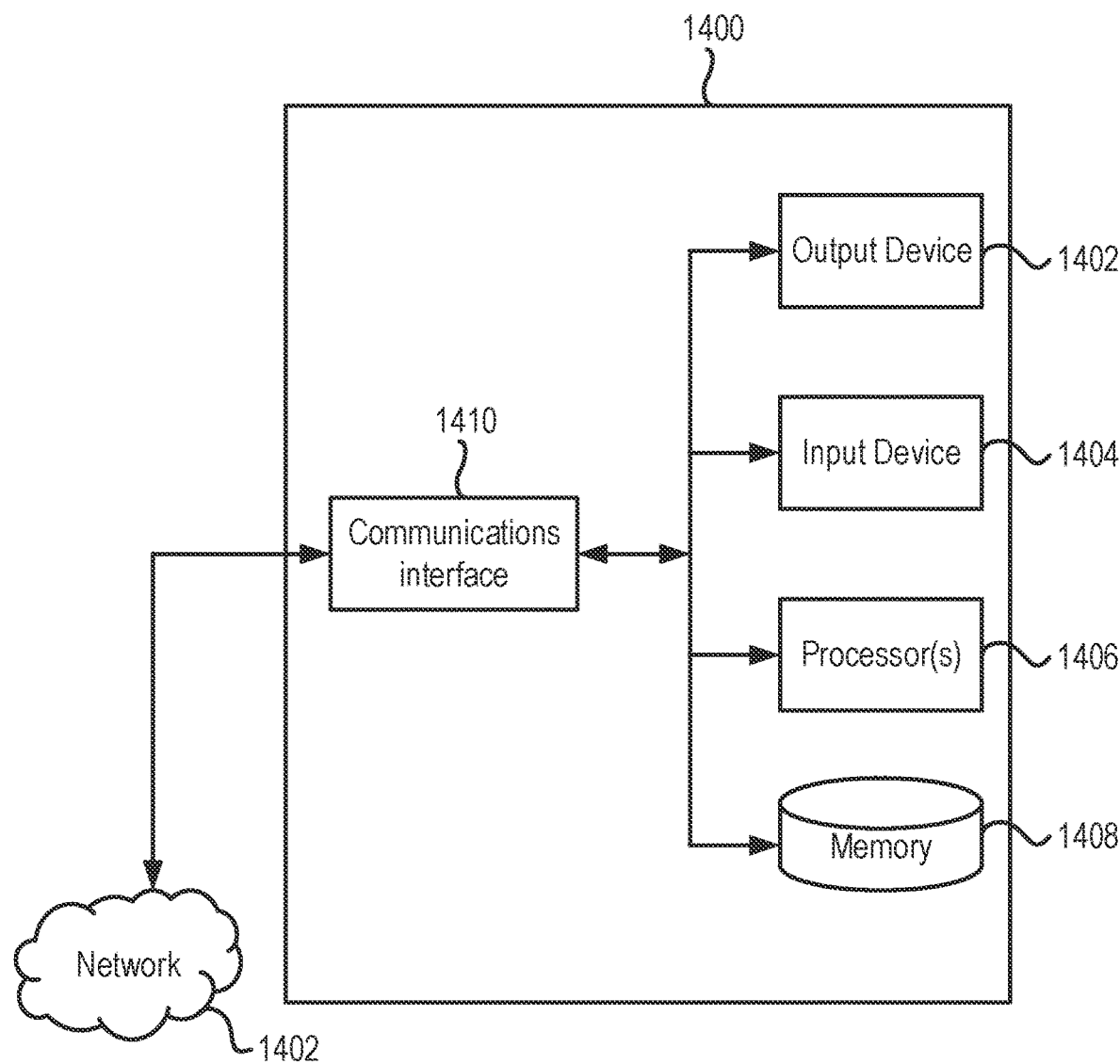
FIG. 14 shows the general architecture of an illustrative computer system that may be employed to implement any of the processes and modules discussed herein.

FIG. 14 shows the general architecture of an illustrative computer system 1400 that may be employed to implement any of the processes and modules discussed herein in accordance with some implementations. The computer system 1400 comprises one or more processors 1406 communicatively coupled with memory 1408, one or more communications interfaces 1410, and one or more output devices 1402 (e.g., one or more display units) and one or more input devices 1404.

In the computer system 1400, the memory 1408 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). In particular, the memory 1408 can store instructions related to the defect detection process 100 and the context aware module 1300 discussed above in relation to FIGS. 1-13. Furthermore, the memory 1408 can store the datasets associated with training one or more artificial neural networks discussed herein, the database 128 discussed herein, image data discussed herein, etc.

The processor(s) 1406 may be used to execute instructions stored in the memory 1408 and, in so doing, also may read from or write to the memory various information processed and or generated pursuant to execution of the instructions. The processor 1406 of the computer system 1400 also may be communicatively coupled to or control the communications interface(s) 1410 to transmit or receive various information pursuant to execution of instructions. For example, the communications interface(s) 1410 may be coupled to a wired or wireless network, bus, or other communication means and may therefore allow the computer system 1400 to transmit information to or receive information from other devices (e.g., other computer systems). While not shown explicitly in the computer system 1400, one or more communications interfaces facilitate information flow between the components of the system 1400. In some implementations, the communications interface(s) 1410 may be configured (e.g., via various hardware components or software components) to provide a website as an access portal to at least some aspects of the computer system 1400. Examples of communications interfaces 1410 include user interfaces (e.g., web pages), through which the user can communicate with the computer system 1400. In some examples, the processor(s) 1406 can include graphical processing units that can be utilized to process one or more layers or stages of the artificial neural networks discussed herein.

The output devices 1402 of the computer system 1400 may be provided, for example, to allow various information to be viewed or otherwise perceived in connection with execution of the instructions. The input device(s) 1404 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method, comprising:
identifying a plurality of potential defect image regions in an input substrate image of an electronic substrate;
generating a plurality of image patches corresponding to the plurality of potential defect image regions, each image patch of the plurality of image patches including at least one potential defect image region of the plurality of potential defect image regions;
processing the plurality of image patches with a first defect presence classifier stage that classifies each of the plurality of image patches as containing or not containing a defect to identify, from the plurality of image patches, a set of image patches containing defect;

processing the set of image patches containing defect with a plurality of additional defect presence classifier stages, each of the plurality of additional defect presence classifier stages having at least one of a width parameter or a depth parameter that is greater than a corresponding parameter of a preceding defect presence classifier stage, each of the plurality of additional defect presence classifier stages identifying a number of image patches containing defects that is equal to or less than a number of image patches containing defects identified by a preceding defect presence classifier stage, a last defect presence classifier stage of the plurality of additional defect presence classifier stages identifying a final set of image patches containing defect;

determining a location on the electronic substrate, a size, and a type of one or more defects in the final set of image patches containing defect; and storing in a data structure the location, the size, and the type of the one or more defects.

2. The method of claim 1, wherein a number of neurons used in one or more stages in a neural network of a defect presence classifier stage of the plurality of additional defect presence classifier stages is greater than a number of neurons used in corresponding one of one or more stages in a neural network of a preceding defect presence classifier stage.

3. The method of claim 1, wherein a number of layers in a neural network of a defect presence classifier stage of the plurality of additional defect presence classifier stages is greater than a number of layers in a neural network of a preceding defect presence classifier stage.

4. The method of claim 1, wherein a size of a dataset used to train a defect presence classifier stage of the plurality of additional defect presence classifier stages is greater than a size of a dataset used to train a preceding defect presence classifier stage.

5. The method of claim 1, further comprising:

monitoring during defect detection a reduction in a number of image patches containing defects identified by each of the plurality of additional defect presence classifier stages, identifying an intermediate defect presence classifier stage of the plurality of additional defect presence classifier stages after which the number of image patches containing defects identified by each subsequent defect presence classifier stage does not decrease; and removing from processing defect presence classifier stages of the plurality of additional defect presence classifier stages that are positioned after the intermediate defect presence classifier stage.

6. The method of claim 1, further comprising:

progressively adding defect presence classifier stages in the plurality of additional defect presence classifier stages until a number of image patches containing defects identified by each added defect presence classifier stage ceases to reduce.

7. The method of claim 1, further comprising:

detecting availability of additional computing resource; and responsive to detecting availability of additional computing resources, adding defect presence classifier stages to the plurality of additional defect presence classifier stages such that total time to process the set of image patches is not impacted.

8. The method of claim 1, further comprising:

determining an amount of time for processing the set of image patches is greater than a threshold value, responsive to determining that the amount of time for processing the set of image patches is greater than the threshold value, reducing a number of defect presence classifier stages from the plurality of additional defect presence classifier stages.

9. A non-volatile computer readable storage medium including instructions stored therein, which when executed by a processor causes the processor to perform a method of:

identifying a plurality of potential defect image regions in an input substrate image of an electronic substrate;

generating a plurality of image patches corresponding to the plurality of potential defect image regions, each image patch of the plurality of image patches including at least one potential defect image region of the plurality of potential defect image regions;

processing the plurality of image patches with a first defect presence classifier stage that classifies each of the plurality of image patches as containing or not containing a defect to identify, from the plurality of image patches, a set of image patches containing defect;

processing the set of image patches containing defect with a plurality of additional defect presence classifier stages, each of the plurality of additional defect presence classifier stages having at least one of a width parameter or a depth parameter that is greater than a corresponding parameter of a preceding defect presence classifier stage, each of the plurality of additional classifier stages identifying a number of image patches containing defects that is equal to or less than a number of image patches containing defects identified by a preceding defect presence classifier stage, a last defect presence classifier stage of the plurality of additional defect presence classifier stages identifying a final set of image patches containing defect;

determining a location on the electronic substrate, a size, and a type of one or more defects in the final set of image patches containing defect; and storing in a data structure the location, the size, and the type of the one or more defects.

10. The non-volatile computer readable storage medium of claim 9, wherein a number of neurons used in one or more stages in a neural network of a defect presence classifier stage of the plurality of additional defect presence classifier stages is greater than a number of neurons used in corresponding one of one or more stages in a neural network of a preceding defect presence classifier stage.

11. The non-volatile computer readable storage medium of claim 9, wherein a number of layers in a neural network of a defect presence classifier stage of the plurality of additional defect presence classifier stages is greater than a number of layers in a neural network of a preceding defect presence classifier stage.

12. The non-volatile computer readable storage medium of claim 9, wherein a size of a dataset used to train a defect presence classifier stage of the plurality of additional defect presence classifier stages is greater than a size of a dataset used to train a preceding defect presence classifier stage.

13. The non-volatile computer readable storage medium of claim 9, the method further comprising:

monitoring during defect detection a reduction in a number of image patches containing defects identified by each of the plurality of additional defect presence classifier stages, identifying an intermediate defect presence classifier stage of the plurality of additional defect presence classifier stages after which the number of image patches containing defects identified by each subsequent defect presence classifier stage does not decrease; and removing from processing defect presence classifier stages of the plurality of additional defect presence classifier stages that are positioned after the intermediate defect presence classifier stage.

14. The non-volatile computer readable storage medium of claim 9, the method further comprising:

progressively adding defect presence classifier stages in the plurality of additional defect presence classifier stages until a number of image patches containing defects identified by each added defect presence classifier stage ceases to reduce.

15. The non-volatile computer readable storage medium of claim 9, the method further comprising:

detecting availability of additional computing resource; and responsive to detecting availability of additional computing resources, adding defect presence classifier stages to the plurality of additional defect presence classifier stages such that total time to process the set of image patches is not impacted.

16. The non-volatile computer readable storage medium of claim 9, the method further comprising:

determining an amount of time for processing the set of image patches is greater than a threshold value, responsive to determining that the amount of time for processing the set of image patches is greater than the threshold value, reducing a number of defect presence classifier stages from the plurality of additional defect presence classifier stages.

* * * * *